United States Patent
Masterman

(10) Patent No.: US 9,813,882 B1
(45) Date of Patent: Nov. 7, 2017

(54) MOBILE NOTIFICATIONS BASED UPON NOTIFICATION CONTENT

(75) Inventor: Michael F. Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 13/531,915

(22) Filed: Jun. 25, 2012

(51) Int. Cl.
*H04W 4/18* (2009.01)
*H04W 4/12* (2009.01)
*H04W 4/14* (2009.01)

(52) U.S. Cl.
CPC .............. *H04W 4/18* (2013.01); *H04W 4/12* (2013.01); *H04W 4/14* (2013.01); *H04W 4/185* (2013.01)

(58) Field of Classification Search
CPC . H04W 4/12–4/16; H04W 4/18; H04W 4/185
See application file for complete search history.

(56) References Cited

U.S. PATENT DOCUMENTS

| | | | | |
|---|---|---|---|---|
| 2003/0099336 A1* | 5/2003 | Speeney | ............... | H04M 1/578 379/88.19 |
| 2006/0116142 A1* | 6/2006 | Cofta | ............ | H04W 8/18 455/466 |
| 2006/0218029 A1* | 9/2006 | Chin | ............ | G06Q 10/109 705/80 |
| 2007/0066283 A1* | 3/2007 | Haar | ............ | H04W 4/12 455/412.2 |
| 2007/0143499 A1* | 6/2007 | Chang | ............ | G06Q 10/10 709/245 |
| 2008/0205610 A1* | 8/2008 | Bishop | ............ | H04L 51/24 379/93.24 |
| 2009/0172103 A1* | 7/2009 | Tuli | ............ | G06Q 10/10 709/206 |
| 2010/0119051 A1* | 5/2010 | Belz | ............ | H04M 3/02 379/207.16 |
| 2010/0219971 A1* | 9/2010 | Appelman | ............ | H04M 1/2478 340/691.3 |
| 2011/0066941 A1* | 3/2011 | Chipchase | ............ | G06F 3/167 715/716 |
| 2012/0229657 A1* | 9/2012 | Calman | ............ | G06Q 50/01 348/207.1 |

* cited by examiner

*Primary Examiner* — Mehmood B Khan
(74) *Attorney, Agent, or Firm* — Thomas | Horstemeyer, LLP

(57) ABSTRACT

Disclosed are various embodiments employed to generate device notifications based upon notification content. To this end, a request to generate a device notification is obtained from a user application. Notification content is extracted from the request and an escalated or de-escalated notification level is applied when the content corresponds to a notification rule stored in the device.

27 Claims, 5 Drawing Sheets

MOBILE NOTIFICATIONS BASED UPON NOTIFICATION CONTENT

BACKGROUND

Current mobile devices provide for an ability to display notifications that are related to received email, short message service (SMS) messages, mobile application notifications, and other types of content that is pushed to the mobile device and/or pulled by the mobile device and subsequently displayed via some type of notification capability provided by the mobile device operating system. Current mobile device applications and/or operating systems may allow for the ability to filter, categorize and/or prioritize notifications based upon a sender or a message and/or an identity of an application through which a notification originates.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
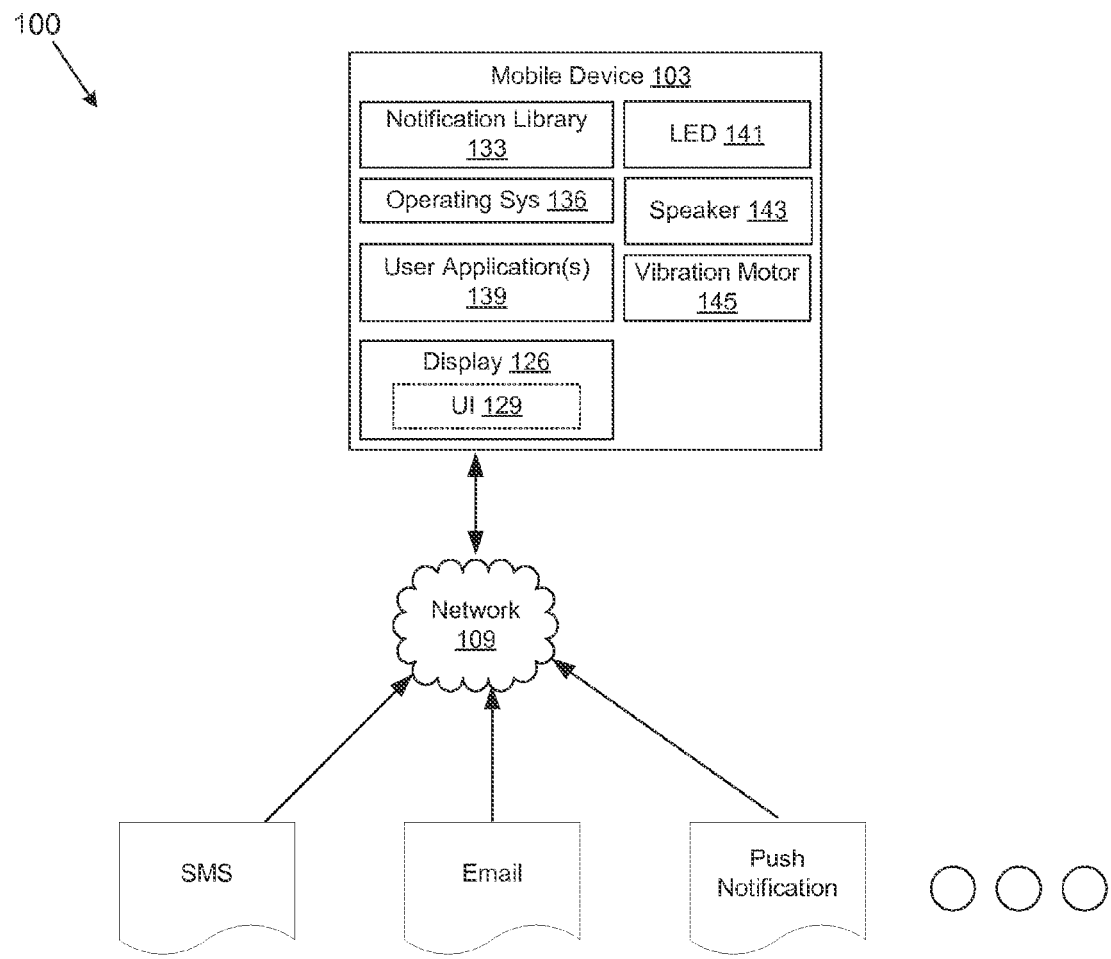
FIG. 1 is a drawing of a networked environment according to an embodiment of the present disclosure.

With reference to FIG. 1, shown is a networked environment 100 that facilitates the use of a mobile device allowing for altering mobile notifications based upon content associated with the notification. Specifically, the networked environment 100 includes at least one mobile device 103 in which notifications can be displayed to a user. First, a general description of the physical makeup of the networked environment 100 and its components is described, followed by a discussion of the operation of the same.

To begin, the networked environment 100 includes one or more mobile devices 103 that are coupled to a network 109. The network 109 may comprise, for example, the Internet, intranets, extranets, wide area networks (WANs), local area networks (LANs), wired networks, wireless networks (such as cellular networks), or other suitable networks, etc., or any combination of two or more such networks.

Each of the mobile devices 103 may comprise, for example, a smartphone, tablet computing device, a portable computing system such as, for example, a laptop, or any other device that generally is portable such that an individual may carry such device from place to place as can be appreciated. To this end, according to one embodiment, a mobile device 103 includes a processor circuit having a processor and a memory as can be appreciated.

According to one embodiment, the mobile device 103 includes a display device 126 such as, for example, liquid crystal display (LCD) screens, gas plasma-based flat panel displays, or other types of display devices, etc. The display device 126 included within the mobile device 103 facilitates the display of one or more user interfaces 129 based upon the operation of various applications in the mobile device 103 as will be described. In addition, a mobile device 103 includes various input and output devices such as, for example, a capacitive touchscreen integrated into the display device 126, externally visible lights, light emitting diodes, vibration motors, or other types of visual indicators, an integrated camera, speakers, microphones, and other devices as can be appreciated.

In addition, the mobile device 103 includes various applications and/or systems such as, for example, a notification library 133, an operating system 136, one or more user applications 139, and other applications and/or systems. The notification library 133 is a portion of the operating system 136 and/or an operating system plug-in, application programming interface (API), library, or other type of software component that can facilitate manipulation of device notifications via a user interface, speakers, vibration motors, and/or externally visible indicators such as an externally mounted LED. The operating system 136 is a device operating system that facilitates communication between software components and applications and the mobile device 103 hardware components, such as a processor circuit, input/output bus, input devices, output devices, etc.

User applications 139 represent one or more applications that can be executed by the mobile device 103 and which can obtain various types of data and display notifications in a user interface rendered on the display device or generate other content in the mobile device 103. A user application 139 can comprise an email application, a calendar application, an SMS application, a browser, or any other type of mobile application that can obtain push notifications or generate notifications based upon data obtained via the network 109 or data stored in the mobile device 103. For example, an email or SMS application may generate notifications in the form of an audible ringtone, activation of a vibration motor, a visible notification in a notification bar or other part of an operating system user interface, a flashing or blinking LED or other types of notifications as can be appreciated. In some embodiments, a user application 139 can represent an operating system resource, service, or any type of application that can request to display or activate any type of device notification in the mobile device 103.

As another example, a calendar application may generate notifications associated with appointments or reminders associated with a calendar that are rendered in a user interface shown on the display 126 based upon calendar data stored within the mobile device 103. Additionally, the calendar application may also generate a notification in the form of a ringtone played via a speaker associated with the mobile device 103 or cause an integrated LED to light or blink periodically in one or more different colors. In these and other scenarios where a user application 139 attempts to generate a notification in a mobile device 103, the user applications 139 can do so via an API provided by the notification library 133 by passing a notification data item that contains notification content, meta data (e.g., content type, image capture device type data, location etc.).

Accordingly, the notification library 133 can determine, based upon the notification content contained in the notification data item, whether a notification rule specifying a particular notification level is associated with the notification content. The notification level can comprise one of many various levels of notification depending upon the importance of the content to a user associated with the mobile device 103. For example, the notification levels associated with the notification library 133 can be ranked according to an importance of the notification content contained within a notification. In this sense, important notification content can be associated with an escalated notification level, which can comprise any combination of user interface elements displayed by the notification library 133 in an operating system user interface, audible or tactile notification, and/or LED notifications. Conversely, less important notification content can be associated with a de-escalated notification level, which can comprise, for example, a less intrusive form of notification generated by the notification library 133. For example, a de-escalated notification level may be characterized by fewer visual notification elements, less intrusive audible notifications, etc. The notification levels can also include a default notification level with which notification content that cannot be associated with an escalated or de-escalated notification level can be associated.

Other solutions generate varying notification levels depending upon a notification type, a sender, and/or originating application of a notification. In contrast, the notification library 133 can maintain one or more notification rules that relate some characteristic of the content of a notification, rather than merely a type, sensor, or originating application of the notification, to a notification level. In other words, the notification library 133 can analyze the content of a notification to determine its importance to the user and generate a corresponding notification of a corresponding notification level. In one scenario, a user application 139 can submit a request to generate a device notification in the form of a notification user interface element that is a popup element and/or one that is placed in a notification bar in an operating system or launcher user interface by submitting a notification data item containing the notification content to the notification library 133. In response, the notification library 133 can extract the notification content and determine whether a notification rule corresponds to the extracted content and specifies a notification level that varies from the notification requested by the user application 139. The notification library 133 can then generate a notification according to the notification level corresponding to the notification rule.

As noted above, the notification level can specify various types of notifications that are displayed by the operating system 136 in a user interface on the display 126, via visible indicators integrated within the mobile device 103, and/or audible alerts via a speaker integrated within the mobile device 103. For example, a user application 139 that is an email application may request a notification in the form of a ringtone, activation of a vibration motor, activation of a certain LED color and repeat pattern and/or frequency, as well as a notification displayed in a notification bar and/or in a notification popup shown in the operating system 136 user interface 129.

However, the notification library 133 may determine that, based upon the content of the notification (e.g., the content of the email body and/or subject) and a corresponding notification rule, that a different notification level should be employed. Accordingly, if a de-escalated notification level is specified by the notification rule for the notification content, the notification library 133 can generate a device notification that can vary from the type of notification requested by the user application 139. For example, in the case of an email notification, the notification rule can specify that an audible tone should not be generated nor should the vibration motor be vibrated, while the visible notifications in the user interface 129 and LED should be generated. The notification rule can specify a notification level that varies from the requested notification in various ways and in various permutations, such as in the form of various volumes or selections of ringtones, a repeat frequency or repeat pattern of a ringtone, vibration motor activation, and/or LED activation, and in other combination and permutations as can be appreciated. For example, the notification rule can specify a particular volume of a ringtone that varies from a default volume level. As another example, the notification rule can specify a pattern with which the vibration motor is activated that varies relative to the default pattern. As yet another example, the notification rule can specify a frequency with which the LED is activated that varies from the default frequency. The notification rule can also specify that a particular application should be launched in response to a notification containing certain notification content.

In some embodiments, a notification rule maintained by the notification library 133 can specify one or more device notifications associated with some characteristic of the content of a notification that vary from the default notifications that correspond to those requested by the user application 139. For example, an email application may ordinarily request from the notification library a particular combination of default device notifications. Accordingly, a notification rule can specify a certain device notifications that in addition to the default notifications. In this scenario, the notifications specified by the notification rule can be utilized in addition to the default notifications. For example, an email application may request to generate device notifications that include the playing of a ringtone, activation of an LED and vibration motor and/or the display of a user interface element. Accordingly, a notification rule can specify that the volume of a default ringtone should be elevated, the frequency with which the LED and/or vibration motor are repeated to be modified, or specify other changes to a default device notifications.

In one embodiment, a user of a mobile device 103 may set up various notification rules via a user interface provided by the notification library 133 on the mobile device and/or via a web based user interface. The notification rules can specify a notification level that includes a combination of device notifications that are associated with a particular type of notification content. In one embodiment, a notification rule can specify that textual notification content that contains certain words and/or punctuation, regardless of the sender and/or identity of the originating user application 139, is associated with an escalated notification level. For example, notification content (e.g., an SMS message) containing exclamation points can be associated with an escalated notification level so that the user of the mobile device 103 is more likely to view the notification in a timely fashion. As another example, a notification rule established by a user can specify that when certain keywords or names (e.g., the name of a family member, friend, etc.) appears in notification content, an escalated notification level is then applied to the notification. As a variation of this example, a notification rule can also specify that when certain words appear in notification content (e.g., words that may often be associated with unsolicited advertising messages), that a de-escalated notification level applies to the notification. The notification library 133 can also initiate a language analysis of the textual notification content to determine whether certain emotions or level of importance can be identified within the content.

If important content can be identified, then the notification library 133 can associate an escalated notification level with the notification.

As another example, notification content (e.g. a mobile application notification from a social networking system), may contain the name of a person in the social network of a user associated with the mobile device 103. Accordingly, a notification rule set up by a user may assign an elevated notification level to the notification when the name of a person within the social network of a user in a social networking system appears in notification content. Therefore, the notification library 133 determine whether a proper name appears in the notification content and then communicate with an API provided by an external social networking system via the network 109 to determine whether a word appearing in the notification content corresponds to a person within the social network of the user. As an additional variation, a notification rule can specify that when the name of a user who appears in a certain category of user within the social network of the user (e.g., family, close friend, etc.), that an escalated and/or de-escalated notification level applies to the corresponding notification containing the name of the user. As another variation, a notification rule can specify that when a proper name appears in the notification content, an escalated or de-escalated notification level is applied when the name corresponds to a name in a contact store associated with the mobile device 103. A contact store can correspond to an address book that is stored on or accessible to the mobile device 103.

A notification rule can also apply to notification content types other than text. For example, a notification rule can specify that notification content that contains and/or links to images, audio, documents, and/or video should be assigned an escalated and/or de-escalated notification level. Additionally, the notification library 133 can be configured to identify certain aspects of the non-textual notification content and determine whether a notification rule specifies that a certain notification level should be applied. In one embodiment, the user may configure a notification rule that specifies that notifications containing an image, audio, and/or video with certain properties should be escalated or de-escalated. For example, the notification rule can specify that an image containing one or more specific people can be associated with an escalated notification level. In this scenario, the notification library 133 can initiate a facial recognition analysis and determine whether a person within the image matches an image of a person within the social network of the user in a social networking system. As another example, the notification rule can specify that an image captured by a specific device type as identified in the image meta data should correspond to an escalated and/or de-escalated notification level.

As yet another example, image containing certain objects, such as products available via an electronic commerce system or other items or item categories specified by the user can be associated with an escalated or de-escalated notification level. Accordingly, the notification library 133 can initiate an object detection analysis to attempt to identify an item or type of item appearing in an image and/or video corresponding to the notification. In another scenario, images that are geo-tagged with certain locations (e.g., a home or office address of the user, or any other location specified by the user), can also be associated with an escalated or de-escalated notification level by a notification rule. As another example, images that contain certain colors and/or a certain percentage or predominance level of a specific color can be associated with an escalated and/or de-escalated notification level by a notification rule.

In the case of an audio and/or video notification content type, a notification rule can also specify that such content where the audio track contains, for example, certain or any voices, songs, or other type of content, can be associated with an escalated or de-escalated notification level. For example, if an audio track contains a specific song or genre of song specified by a notification rule, an escalated or de-escalated notification level can be applied. As another example, an audio track containing the voice of certain people can be similarly treated. Accordingly, the notification library 133 can initiate an audio recognition analysis on an audio track associated with an audio and/or video file and determine whether the content is associated with a notification rule specified by a user and maintained by the notification library 133.

In the case of a document that is associated with a notification (e.g., attached to an email message), the notification library 133 can apply text, image, and/or video based notification rules to the content of the document. For example, a notification rule that specifies that notification content containing certain words, punctuation, or other content can also be applied to the document. Similarly, image and video based notification rules can also be applied to the document.

The notification library 133 can also examine meta data associated with a document, such as the author, revision history, the identity of a user most recently modified the document, etc., to determine whether an escalated or de-escalated notification level can be applied to the notification. For example, if the author of a document can be identified as a user within the same domain as the user of the mobile device 103, the notification library 133 can apply an escalated notification level to the notification. As another example, if the revision history of the document indicates that a user other than the user of the mobile device 103 has last saved the document, the notification library 133 can generate an escalated notification level, as this may indicate that the document is one that the recipient should review.

Additionally, a notification rule can also be based upon content that is stored on the mobile device 103, such as in a calendar associated with a calendar application. Accordingly, if an email application or any other user application 139 attempts to generate a notification related to an email or other type of notification that contains information about an event that is upcoming on the calendar stored on the mobile device 103, the notification library 133 can associate an escalated notification level with the notification. For example, if an email message containing text related to an upcoming meeting on the device calendar (e.g., changing the time of a meeting, scheduling a meeting in the near future) is received by an email application and the application attempts to generate a notification, the notification library 133 can examine the notification content and determine whether the related event is in the near future. The near future can be defined as any configurable amount of time from the time at which the notification is received. If so, then an escalated notification level can be applied. If the related event is in the distant future, then a de-escalated notification level can be applied. In this way, the notification library 133 can allow for notification rules that have a temporal component, meaning that the notification level that is applied depends upon the current time as well as the time and/or date associated with an event that is related to the notification content.

The notification library 133 can identify whether notification content is associated with an upcoming event in a device calendar by identifying keywords, the sender of a message, or analysis of other properties of the notification content. For example, if a notification associated with a calendar application is also associated with a sender that is an invitee, attendee, and/or meeting organizer of an event, the notification library 133 can associate an escalated notification level to the notification.

A notification rule can also be based upon content that is stored on a device other than the mobile device 103, such as in a calendar that is stored on a remote system. For example, a notification rule can be based upon any other type of data stored on a remote system or service, such as a virtual shopping cart in an electronic commerce system, a product watch list or wish list in an online retail site, auction site, or any other type of site. In this scenario, the notification library 133 can examine notification content and determine whether the content is related to one or more of these data sources and generate an escalated or de-escalated notification level. For example, the notification library can determine whether notification content is related to a product in virtual shopping cart, wish list, and/or watch list in an online retail or auction site, and generate an escalated notification level.

The notification library 133 can also generate notification rules by learning what types of notifications are of importance to the user of the mobile device 103. To accomplish this, the notification library 133 can identify a user input in response to a notification that is generated by the notification library 133 and determine whether the user input represents a user interaction or a lack of a user interaction with the notification. If a user interaction with the notification is detected, such as when a user opens a notification or a user application related to the notification, the notification library 133 can generate a notification rule that assigns an escalated notification level to the notification content contained within the notification as well as other similar or related notification content. If a lack of a user interaction with the notification is detected, such as when a user dismisses or cancels a notification generated by the notification library 133, then the notification library 133 can generate a notification rule that assigns a de-escalated notification level to the notification content contained within the notification as well as other similar or related notification content.

As another example, the notification library 133 can generate notification rules by determining based upon actions within a user application 139 that the user may take. For example, user interaction with the notification is detected, such as when a user opens a notification related to an email message, SMS message, or any other type of message, and then user subsequently deletes the associated message, the notification library can assign a de-escalated notification level to the notification content contained within the notification as well as other similar or related notification content. Additionally, in this scenario, the notification library 133 can also detect whether the user reads, replies to, or otherwise interacts with the message and assign an escalated notification level to the notification content contained within the notification as well as other similar or related notification content.

Figure 2:
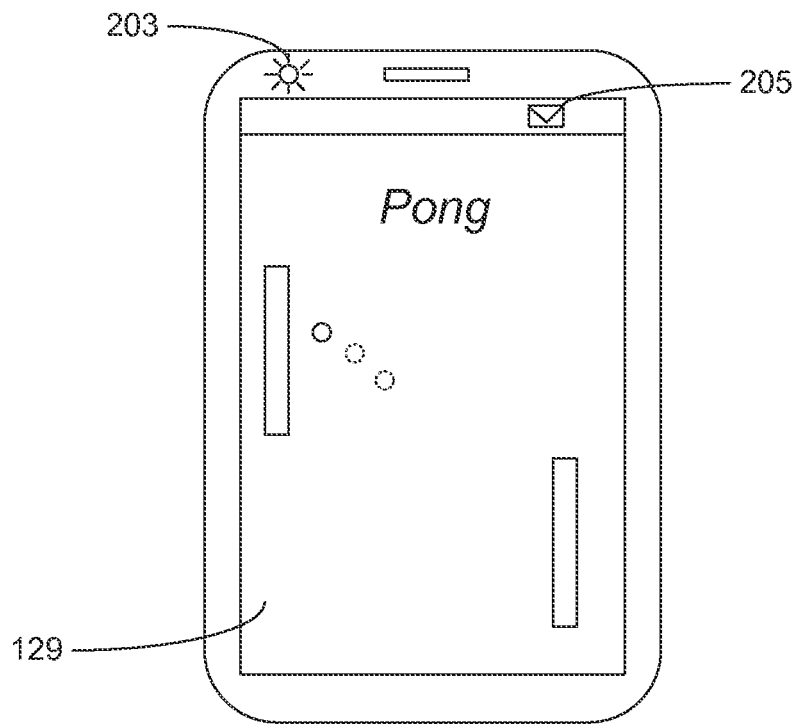
FIGS. 2-4 are drawings of example user interfaces generated in a mobile device according to an embodiment of the present disclosure.

Referring next to FIG. 2, shown is an example of a mobile device 103 displaying a user interface 129 in which various types of notifications can be generated by the notification library 133. In the example of FIG. 2, also shown is an example of an externally visible LED 203 that can be activated by the notification library 133 in response to a request to generate a notification from a user application 139. In the depicted example, a user application 139, such as an email application has requested to generate a notification in the mobile device 103. Accordingly, in the scenario shown in FIG. 2, the user application 139 has requested that the notification include periodic activation of the LED 203 as well as display of a notification badge 205 in a notification area of the user interface 129 and potentially playing of a ringtone associated with the email application. Therefore, in this scenario, the notification library 133 can generate the requested notifications. For example, in this scenario, there may be no predefined notification rules corresponding to the content of the notification (e.g., the body and/or subject of the email message). Therefore, if there are no predefined notification rules corresponding to the notification content, the notification library 133 can generate notification according to a default behavior, which can include generating the notifications requested by the user application 139.

Figure 3:
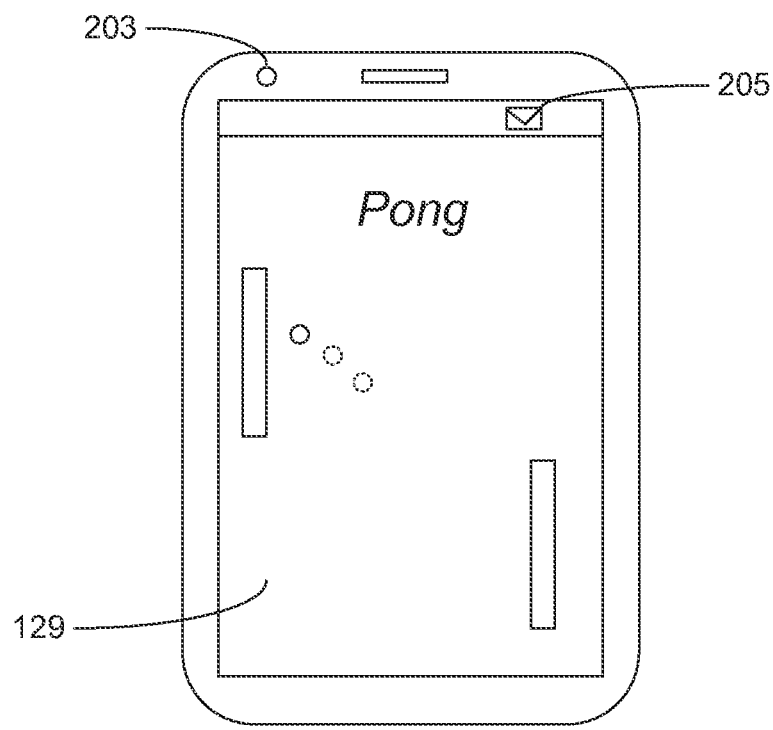

Referring next to FIG. 3, shown is an alternative example of a mobile device 103 and user interface 129 in which the notification library 133 has generated a device notification corresponding to a notification rule. In the depicted example, a notification rule specifying a de-escalated notification level is identified that applies to the notification content of the notification request from the email application. Accordingly, the notification rule can specify that the notification library 133 generates device notifications that vary from those requested by the user application 139. In this example, the notification library 133 can display the notification badge 205 but can also suppress activation of the LED 203 as well as potentially suppress playing of a ringtone.

Figure 4:
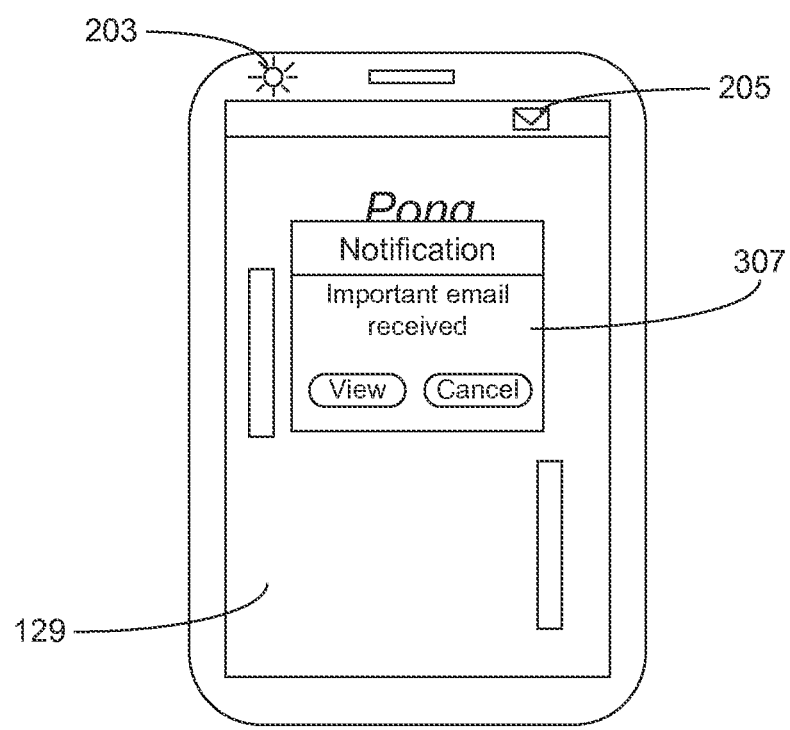

Referring next to FIG. 4, shown is an alternative example of a mobile device 103 and user interface 129 in which the notification library 133 has generated a device notification corresponding to a notification rule. In the depicted example, a notification rule specifying a escalated notification level is identified that applies to the notification content of the notification request from the email application. Accordingly, the notification rule can specify that the notification library 133 generates device notifications associated with an escalated notification level. In one embodiment, the escalated notification level includes additional or alternative device notifications that can signal importance of the notification to the user of the mobile device 103. The escalated notification level can include device notifications that vary from those requested by the user application 139.

In this example, the notification library 133 can display the notification badge 205 and activate the LED 203, which may be the device notifications requested by the user application 139. The notification library 133, in order to effectuate an escalated notification level, can also display a popup notification 307 in the user interface 129 that includes user interface elements with which the user may interact. In this example, the popup notification 307 allows the user to dismiss the notification or view additional information related to the notification (e.g., the email message). The notification library 133 can also periodically activate a vibration motor associated with the mobile device until the user interacts with popup notification 307 even though such a notification may not have been requested by the user application 139.

Additionally, the notification library 133 can also refine and/or define notification rules that are related to the notification content based upon user interaction with the popup notification 307. In the depicted example, the notification library 133 can detect user input that corresponds to user interaction with the notification, such as activation of the "View" button. The notification library 133 can also detect user input that corresponds to a lack of user interaction with the notification, such as activation of the "Cancel" button. In the case of detection of user interaction with the notification, the notification library 133 can confirm a notification rule associated with the notification content as well as related or similar content. The notification library 133 can also adjust the notification rule applying to the notification content to an even more escalated notification level. In the case of detection of a lack of user interaction with the notification, the notification library 133 can adjust the notification rule associated with the notification content as well as related or similar content so that a de-escalated notification level is applied.

Figure 5:
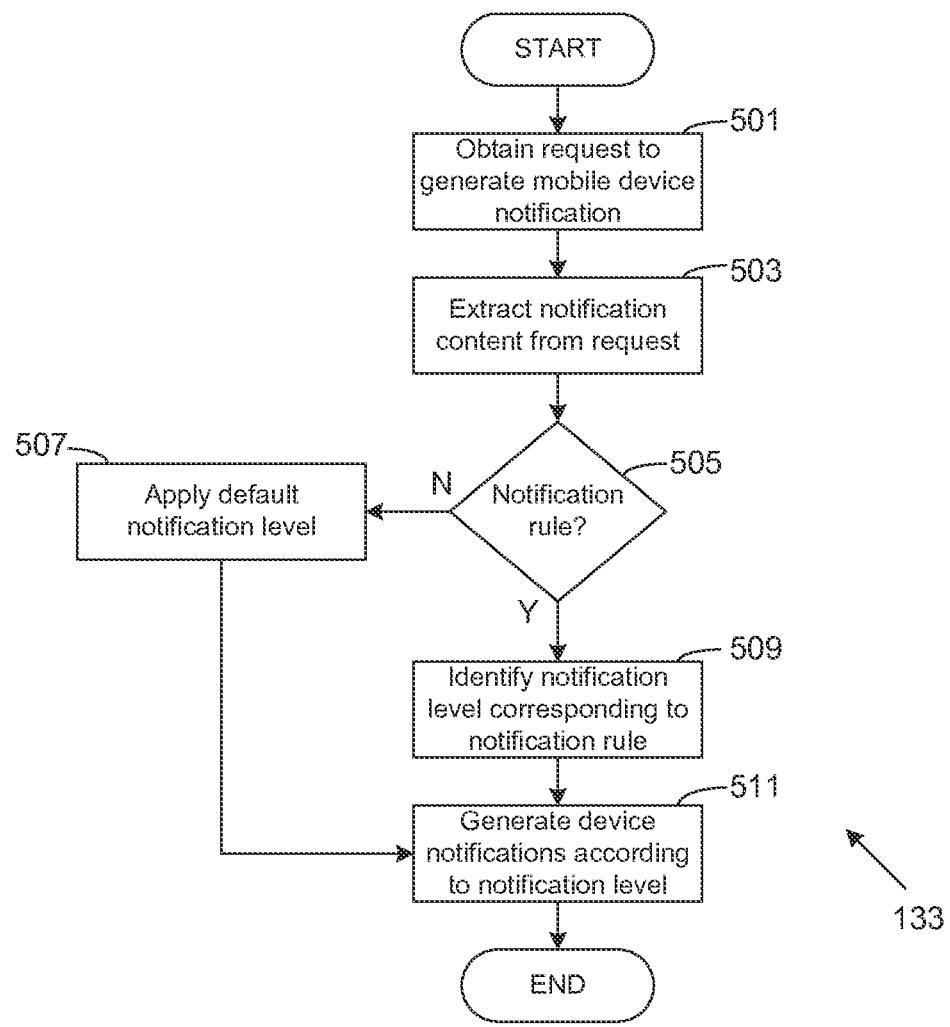
FIG. 5 is a flowchart that illustrates one example of a portion of the operation of the notification library in a mobile device according to an embodiment of the present disclosure.

Referring next to FIG. 5, shown is a flowchart that provides one example of the operation of at least a portion of the notification library 133 according to an embodiment of the present disclosure. Alternatively, the flowchart of FIG. 5 may be viewed as depicting steps of an example of a method implemented in a mobile device 103 (FIG. 1).

Beginning with box 501, the notification library 133 obtains a request from a user application 139 executed by the mobile device 103 to generate one or more device notifications. The request can include a notification data item that includes notification content that is related to the notification or that the user application 139 is attempting to place in a visual notification user interface element. The notification data item also includes the requested types of notification, such as whether to place a notification badge in a user interface, a popup element, LED activation, vibration motor activation, and/or playing of audible alerts or ringtones. As noted above, a user application 139 can include any application executed by the mobile device 103 that initiates notifications in the mobile device 103 that are related to communications (e.g., email, SMS, mobile application push notifications, etc.) obtain on behalf of a user as well as applications that generate notifications related to any other type of content (e.g., calendar applications, games, electronic commerce applications, etc.).

The notification library 133 extracts the notification content in box 503. The notification content can include textual data as well as images, audio, and/or video, or any combination thereof. In box 505, the notification library determines whether a notification rule is defined that applies to the notification content and/or content that is similar to the notification. As noted above, the notification library 133 can determine whether a notification rule is defined that applies to text and/or punctuation mark within a textual notification as well as to objects and/or people detected within an image, a document, video and/or audio. Additionally, a notification rule can be defined that applies when a certain number of punctuation marks are detected within notification content.

Notification rules can also be associated with text properties of text that is within notification content, such as the capitalization of text and/or a percentage of capitalized text within notification content (e.g., all caps, etc.). A notification rule can also be based upon a language analysis of text within notification content. For example, the notification library 133 can initiate a language analysis to detect the tone of textual content within the notification content. If the tone indicates that the notification content contains information that is urgent and/or important, the notification library 133 can initiate an escalated notification level associated with the notification content.

In box 507, the notification library 133 can apply a default notification level if a notification rule is not defined that applies to the extracted notification content. In one embodiment, the default notification level can include generating the notifications requested by the user application 139, taking into account whether the mobile device 103 is in a quiet mode, silent mode, loud mode, or other type of operating system setting that affects the type and/or degree of device notifications desired by the user. In box 509, if a notification rule is identified that corresponds to the notification content, the notification library can then identify a notification level that corresponds to the notification rule. The notification level specified by the notification rule can define various types of device notifications that should be applied. The various types of device notifications can relate to the importance of the notification content. Finally, in box 511, the notification library 133 can cause the device notification specified by the notification level applied to be generated in the mobile device 103.

Figure 6:
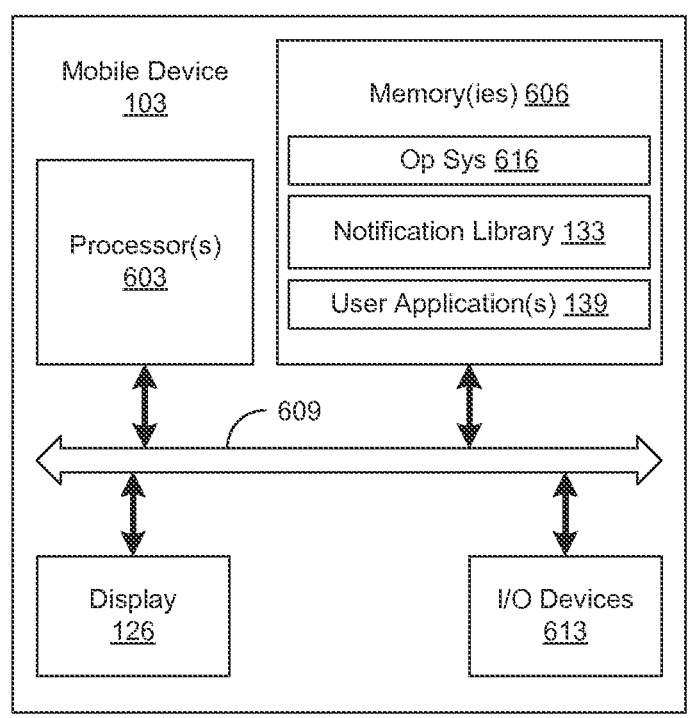
FIG. 6 is a schematic block diagram that depicts one example of a mobile device in the networked environment of FIG. 1 according to an embodiment of the present disclosure.

Referring next to FIG. 6, shown is a schematic block diagram of one example of a mobile device 103 according to an embodiment of the present disclosure. The mobile device 103 includes a processor circuit, for example, having a processor 603 and a memory 606, both of which are coupled to a local interface 609. To this end, the mobile device 103 may comprise, for example, a portable device such as laptop, personal digital assistant, cellular telephone, or other device. The local interface 609 may comprise, for example, a data bus with an accompanying address/control bus or other bus structure as can be appreciated. The mobile device 103 includes the display 126 coupled to the local interface 609 to allow the processor 603 to apply visual data to the display 126. In some embodiments, the mobile device 103 can include other elements that are coupled to the local interface 609, such as a location system configured to obtain location or position data associated with the mobile device 103, and other systems as can be appreciated. In addition, the mobile device 103 includes various input/output devices 613 such as a capacitive touchscreen, toggles, push buttons, microphones, speakers 143, vibration motors 145, LEDs 141, one or more wired and/or wireless network interfaces, and other devices that are coupled to the local interface 609.

Stored in the memory 606 are several components that are executable by the processor 603. In particular, stored in the memory 606 are an operating system 616, the notification library 133, one or more user applications 139, and other systems and applications. Also, various data may be stored, for example, in the memory 606, or some other memory accessible to the mobile device 103. It is understood that there may be other applications that are stored in the memory 606 and are executable by the processor 603 as can be appreciated. Where any component discussed herein is implemented in the form of software, any one of a number of programming languages such as, for example, C, C++, Java, Java Script, Perl, Python, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by a respective processor 603, source code that may be expressed in proper format such as object code that is capable of being loaded into a random access portion of the memory 606 and executed by a processor 603, or source code that may be interpreted by another executable program to generate instructions in a random access portion of the memory 606 to be executed by a processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 603 may represent multiple processors and the memory 606 may represent multiple memories that operate in parallel. In such a case, the local interface 609 may be an appropriate network that facilitates communication between any two of the multiple processors, between any processor and any one of the memories, or between any two of the memories etc. The local interface 609 may comprise additional systems designed to coordinate this communication, including, for example, performing load balancing. The processor 603 may be of electrical or of some other available construction.

Although various systems and applications such as the notification library 133 and/or other systems and applications mentioned above may be depicted as being embodied in software or code executed by general purpose hardware such as processor-based systems as discussed above, as an alternative the same may also be embodied in dedicated hardware or a combination of software/general purpose hardware and dedicated hardware. If embodied in dedicated hardware, such systems and applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 5 shows the architecture, functionality, and operation of an implementation of the notification library 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where various systems and applications described herein such as the notification library 133 and/or other systems and applications comprise software or code, each can be embodied in any computer-readable medium for use by or in connection with an instruction execution system such as, for example, a processor in a computer system or other system. In this sense, such systems or applications may comprise, for example, statements including instructions and declarations that can be fetched from the computer-readable medium and executed by the instruction execution system. In the context of the present disclosure, a "computer-readable medium" can be any medium that can contain, store, or maintain the above-described systems and applications for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, Universal Serial Bus (USB) flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having program instructions stored thereon and executable by a mobile computing device, the program instructions, when executed by the mobile computing device, causing the mobile computing device to:
identify a programmatic call to a notification library of an operating system of the mobile computing device invoked by a user application to generate a mobile device notification to be displayed locally on the mobile computing device, wherein the programmatic call comprises an application programming interface (API) call to the notification library invoked by the user application;

analyze the programmatic call to identify a first task to be performed locally on the mobile computing device to display notification content in association with the mobile device notification, the notification content comprising textual content, the first task to be performed locally on the mobile computing device comprising at least one of: displaying the notification content in an operating system user interface, activating a light emitting diode (LED), playing a sound, or activating a vibration motor of the mobile computing device;

identify a notification rule associated with the notification content, wherein the notification rule comprises a predefined word or a predefined punctuation specified by a user of the mobile computing device;

identify an escalated notification level associated with the notification rule in response to the textual content of the notification comprising at least one of the predefined word or the predefined punctuation specified previously by a user;

identify a second task to perform locally on the mobile computing device in place of the first task based at least in part on the escalated notification level, the second task being different than the first task; and cause performance of the second task in association with the mobile device notification on the mobile computing device in accordance with the escalated notification level.

2. A computer-implemented method, comprising:

obtaining, by a mobile computing device, a notification data item associated with at least one application executed by the mobile computing device in response to a programmatic call to an operating system function invoked by a user application to display notification content included within the notification data item, wherein the notification data item is specified in the programmatic call;

extracting, by the mobile computing device, the notification content from the notification data item and a first task to be performed in association with a display of the notification data item on the mobile computing device, the notification content comprising textual content and punctuation;

determining, by the mobile computing device, that at least a portion of the textual content or the punctuation of the notification content is associated with a notification rule specifying a notification level associated with the notification content; and generating, by the mobile computing device, a second task to be performed in place of the first task, the second task being identified based at least in part on the notification level.

3. The computer-implemented method of claim 2, wherein the second task further comprises at least one of: rendering a notification user interface element in a display device associated with the mobile computing device, playing an audible notification via a speaker associated with the mobile computing device, activating a vibration motor associated with the mobile computing device, or generating a visual notification via at least one externally visible light emitting diode (LED) associated with the mobile computing device.

4. The computer-implemented method of claim 2, wherein the second task further comprises launching an application in the mobile computing device specified by the notification rule.

5. The computer-implemented method of claim 2, further comprising:

obtaining, by the mobile computing device, a user input in response to the second task being performed on the mobile computing device; and performing, by the mobile computing device, a modification of the notification rule associated with the notification content based at least in part upon the user input, wherein the modification of the notification rule causes the mobile computing device to perform a third task in response to an identification of subsequent notification data having the notification level, the third task being a user task performed when providing the user input.

6. The computer-implemented method of claim 5, wherein performing the modification of the notification rule associated with the notification content further comprises:

escalating, by the mobile computing device, the notification level associated with the notification rule in response to a user interaction with the device notification being detected; or de-escalating, by the mobile computing device, the notification level associated with the notification rule in response to a lack of user interaction with the device notification being detected.

7. A system, comprising:

a mobile computing device comprising at least one hardware processor in data communication with an electronic data store, the mobile computing device having a notification library stored thereon configured to:

identify a function call to the notification library invoked by a user application executed in the mobile computing device to generate a device notification in the mobile computing device;

identify notification content and a first task to be performed on the mobile computing device in response to the function call, the notification content comprising textual content and punctuation;

determine that at least a portion of the textual content or the punctuation of the notification content corresponds to a notification rule stored in the mobile computing device, wherein the notification rule comprises the textual content or the punctuation specified by a user;

identify a notification level associated with the notification rule; and perform a second task in place of the first task based at least in part on the notification level.

8. The system of claim 7, wherein the notification level associated with the notification rule comprises one of an escalated or de-escalated notification level relative to a requested notification level.

9. The system of claim 7, wherein the first task or the second task comprise at least one of: generating a notification user interface element, initiating playback of a sound, activating a light emitting diode (LED) integrated with the mobile computing device, or activating a vibration motor integrated with the mobile computing device.

10. The system of claim 9, wherein the notification rule specifies at least one of a repeat frequency, a repeat pattern, or an intensity associated with the combination of the at least one of: generating the notification user interface element, initiating playback of the sound, activating the light emitting diode (LED) integrated with the mobile computing device, or activating the vibration motor associated with the mobile computing device.

11. The system of claim 7, wherein the mobile computing device is further configured to determine that the notification content corresponds to the notification rule stored in the electronic data store by determining that the notification content contains the punctuation specified by the notification rule.

12. The system of claim 7, wherein the mobile computing device is further configured to determine that the notification content corresponds to the notification rule stored in the electronic data store by determining that the textual content contains at least one keyword specified by the notification rule.

13. The system of claim 7, wherein the mobile computing device is further configured to determine that the notification content corresponds to the notification rule stored in the electronic data store by:
   extracting a proper name from the textual content; and
   determining that the proper name corresponds to a linked user account of a social networking system that is associated with a user account of the social networking system corresponding to the mobile computing device.

14. The system of claim 7, wherein the mobile computing device is further configured to determine that the notification content corresponds to the notification rule stored in the electronic data store by:
   extracting at least one of a date or a time from the notification content;
   determining the notification content corresponds to an event stored in a calendar stored in the electronic data store; and
   associating the notification content with an escalated notification level when the notification content corresponds to the event stored in the calendar.

15. The system of claim 7, wherein the mobile computing device is further configured to determine that the notification content corresponds to the notification rule stored in the electronic data store by:
   determining that the notification content corresponds to an event stored in a calendar stored in the electronic data store; and
   associating the notification content with an escalated notification level when the event occurs within a configurable amount of time from receipt of the function call.

16. The system of claim 7, wherein the mobile computing device is further configured to determine that the notification content corresponds to the notification rule stored in the electronic data store by:
   determining that the notification content corresponds to an event stored in a calendar stored in the electronic data store; and
   associating the notification content with an escalated notification level when a sender of a message associated with the notification is at least one of an invitee, an attendee, or a meeting organizer.

17. The system of claim 7, wherein the mobile computing device is further configured to determine that the notification content corresponds to the notification rule stored in the electronic data store by:
   determining that the notification content corresponds to a calendar invitation; and
   associating the notification content with an escalated notification level when a meeting time associated with the calendar invitation is within a predetermined threshold amount of time from a current time.

18. The system of claim 7, wherein the mobile computing device is further configured to determine that the notification content corresponds to the notification rule stored in the electronic data store by:
   determining that the notification content corresponds to a calendar invitation; and
   associating the notification content with an escalated notification level when a user associated with the calendar invitation comprises a contact entry in an address book stored on the mobile computing device and at least one of an invitee, an attendee, or a meeting organizer.

19. The computer-implemented method of claim 2, wherein the notification rule specifies the notification level based at least in part the punctuation in the notification content.

20. The computer-implemented method of claim 2, wherein the notification rule specifies the notification level based at least in part upon a capitalization of a letter of the textual content.

21. The system of claim 7, wherein the mobile computing device is further configured to determine that the notification content corresponds to the notification rule stored in the electronic data store by:
   extracting a proper name from the textual content; and
   determining that the proper name corresponds to a linked user in at least one of a contact store associated with the mobile computing device.

22. The non-transitory computer-readable medium of claim 1, wherein the notification library comprises a portion of an operating system executable by the mobile computing device.

23. The non-transitory computer-readable medium of claim 1, wherein the second task to be performed locally on the mobile computing device comprises at least one of: displaying the notification content in an operating system user interface, activating the light emitting diode (LED), playing the sound, or activating the vibration motor of the mobile computing device.

24. The non-transitory computer-readable medium of claim 1, wherein the second task further comprises launching an application in the mobile computing device specified by the notification rule.

25. The non-transitory computer-readable medium of claim 1, further comprising program instructions that, when executed by the mobile computing device, cause the mobile computing device to perform a modification of the notification rule associated with the notification content.

26. The non-transitory computer-readable medium of claim 25, wherein performing the modification of the notification rule associated with the notification content further comprises further escalating the escalated notification level associated with the notification rule in response to a user interaction with the second task being detected.

27. The non-transitory computer-readable medium of claim 25, wherein performing the modification of the notification rule associated with the notification content further comprises de-escalating the escalated notification level associated with the notification rule in response to a user interaction with the second task not being detected.

* * * * *